US006330250B1

(12) United States Patent
Curry et al.

(10) Patent No.: US 6,330,250 B1
(45) Date of Patent: *Dec. 11, 2001

(54) TELECOMMUNICATIONS NETWORK

(75) Inventors: James E. Curry, Herndon; Robert D. Farris, Sterling, both of VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/584,691

(22) Filed: Jun. 1, 2000

Related U.S. Application Data

(63) Continuation of application No. 09/291,037, filed on Apr. 14, 1999, which is a continuation of application No. 08/710,594, filed on Sep. 20, 1996, now Pat. No. 5,923,659.

(51) Int. Cl.$^7$ .............................. H04J 3/16; H04M 11/00
(52) U.S. Cl. ........................................ 370/467; 379/93.15
(58) Field of Search ..................................... 370/401, 402, 370/403, 404, 405, 408, 466, 467, 351, 352; 379/93.15

(56) References Cited

U.S. PATENT DOCUMENTS

| | | |
|---|---|---|
| 4,916,691 | 4/1990 | Goodman . |
| 5,247,571 | 9/1993 | Kay et al. . |
| 5,422,941 | 6/1995 | Hasenauer et al. . |
| 5,590,133 | 12/1996 | Billström et al. . |
| 5,608,786 | 3/1997 | Gordon . |
| 5,610,910 | 3/1997 | Focsaneanu et al. . |
| 5,661,790 | 8/1997 | Hsu . |

(List continued on next page.)

OTHER PUBLICATIONS

"The Internet Telephony Red Herring", by C. Low, Hewlett–Packard Laboratories, May 15, 1996, pp. 1–15.

"WebIN–an Architecture for Fast Deployment of IN–based Personal Services", by C. Low et al., Intelligent Network Workshop, 1996, IN '96, *IEEE*, Apr. 21–24, 1996, vol. 2, 196+258.

"Understanding the Voice–Enabled Internet", by Margulies, Flatiron Publishing, Inc., pp. 4–42 and 12–1 to 12–3.

"Freebie Heebie–Jeebies: New Long–Distance Calling Via the Internet Scares Small Phone Firms", by Mills, Mar. 8, 1996, *The Washington Post*, Sec. F., pp. 1–2.

"What Hath (Net) God Wrought?", by Hughes, *The Journal* (Fairfax, Virginia), Feb. 21, 1995, Sec. B, pp. 1–2.

"WebPhone Heading for Serious Telephony", by Hughes, *The Journal* (Fairfax, Virginia), May 28, 1996, Sec. A, p. 8.

"It's The Net's Best Thing to Being There: With Right Software, Computer Becomes Toll–Free Telephone", by Mills, Jan. 23, 1996, *The Washington Post*, Sec. C, pp. 1 and 5.

"Internet Phone Wars Heating Up: Companies Improve and Encourage Users to Test Products", by Hughes, Jan. 2, 1996, *The Journal* (Fairfax, Virginia), Sec. A, p. 6.

"INETPhone: Telephone Services and Servers on Internet", by Yan, Feb. 12, 1997, http://ds.internic.net/rfc/rfc1789.txt.

"The Voice of Technology" (Online text only), by Kuehn, *Credit World*, vol. 82, No. 6, pp. 20–23.

*Primary Examiner*—Chau Nguyen
*Assistant Examiner*—Phuongchau Ba Nguyen

(57) ABSTRACT

A system and method for controlling on a worldwide basis two or more telecommunications networks which are themselves capable of exercising a form of common channel signaling network control. The system uses an architecture in which a destination telecommunications network having common channel signaling control is connected to an originating telecommunications network having common signaling control through a call set up and control methodology which provides ad hoc connection between the two spaced telecommunication networks and common channel signaling networks via an unrelated world wide data network which preferably constitutes the Internet.

10 Claims, 14 Drawing Sheets

U.S. PATENT DOCUMENTS

| | | |
|---|---|---|
| 5,706,286 | 1/1998 | Reiman et al. . |
| 5,712,903 | 1/1998 | Bartholomew et al. . |
| 5,724,355 | 3/1998 | Bruno et al. . |
| 5,726,984 | 3/1998 | Kubler et al. . |
| 5,732,213 | 3/1998 | Gessel et al. . |
| 5,737,404 | 4/1998 | Segal . |
| 5,751,961 | 5/1998 | Smyk . |
| 5,774,695 | 6/1998 | Autrey et al. . |
| 5,793,762 | 8/1998 | Penners et al. . |
| 5,793,771 | 8/1998 | Darland et al. . |
| 5,812,639 | 9/1998 | Bartholomew et al. . |
| 5,838,682 | 11/1998 | Dekelbaum et al. . |
| 5,841,764 | 11/1998 | Roderique et al. . |
| 5,844,896 | 12/1998 | Marks et al. . |
| 5,850,433 | 12/1998 | Rondeau . |
| 5,867,495 | 2/1999 | Elliott et al. . |
| 5,870,565 | 2/1999 | Glitho . |
| 5,883,891 | 3/1999 | Williams et al. . |
| 5,889,774 | 3/1999 | Mirashrafi et al. . |
| 5,910,946 | 6/1999 | Csapo . |
| 5,917,424 | 6/1999 | Golman et al. . |
| 5,918,179 | 6/1999 | Foladare et al. . |
| 5,923,659 | 7/1999 | Curry et al. . |
| 5,940,598 | 8/1999 | Strauss et al. . |
| 5,974,043 | 10/1999 | Solomon . |
| 5,974,052 | 10/1999 | Johnson et al. . |
| 5,991,291 | 11/1999 | Asai et al. . |
| 6,005,926 | 12/1999 | Mashinsky . |
| 6,014,379 | 1/2000 | White et al. . |
| 6,021,126 | 2/2000 | White et al. . |

TELECOMMUNICATIONS NETWORK

CROSS-REFERENCE TO RELATED APPLICATIONS

The present application is a continuation application of U.S. Ser. No. 09/291,037, filed Apr. 14, 1999, which was a continuation application of U.S. Ser. No. 08/710,594, filed Sep. 20, 1996, now U.S. Pat. No. 5,923,659.

TECHNICAL FIELD

The present invention relates to a telecommunications network and more particularly relates to a public switched telecommunications network having a control signaling system which provides wide area national and international routing and supervision using out of band signaling which includes a virtual common channel signaling system which does not require an end to end exchange of data messages using a connection oriented mode of signaling. The following background material introduces various telephone network control and computer network concepts and definitions and those familiar with telephone network control and computer networks and TCP/IP may wish to skip to following subsections.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Advanced Intelligent Network (AIN)
Answer Message (ANM)
Application Service Part (ASP)
Backward Indicator Bit (BIB)
Backward Sequence Number (BSN)
Central Office (CO)
Common Channel Signaling (CCS)
Common Channel Interoffice Signaling (CCIS)
Customer Identification Code (CIC)
Cyclic Redundancy Code (CRC)
Data and Reporting System (DRS)
Destination Point Code (DPC)
Dual Tone Multifrequency (DTMF)
Fill in Signal Unit (FISU)
Global Title (GTT)
Initial Address Message (IAM)
Integrated Service Control Point (ISCP)
Integrated Services Digital Network (ISDN)
ISDN User Part (ISDN-UP)
International Standards Organization (ISO)
Link Service Signaling Unit (LSSU)
Local Access and Transport Area (LATA)
Message Signaling Unit (MSU)
Message Transfer Part (MTP)
Multi-Services Application Platform (MSAP)
Open Systems Interconnection (OSI)
Operations, Maintenance, Application Part (OMAP)
Origination Point Code (OPC)
Point in Call (PIC)
Point in Routing (PIR)
Point of Presence (POP)
Recent Change (RC)
Service Control Point (SCP)
Service Creation Environment (SCE)
Service Information Octet (SIO)
Service Management System (SMS)
Service Switching Point (SSP)
Signaling Connection Control Part (SCCP)
Signaling Link Selection (SLS)
Signaling System 7 (SS7)
Signaling Point (SP)
Signaling Transfer Point (STP)
Subsystem Number (SSN)
Time Slot Interchange (TSI)
Transaction Capabilities Applications Protocol (TCAP)

BACKGROUND

Computer Network Background

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames or packets between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network. A detailed knowledge of network architecture is not needed for an understanding of this invention, but a brief description follows by way of further background.

At the heart of any computer network is a communication protocol. A protocol is a set of conventions or rules that govern the transfer of data between computer devices. The simplest protocols define only a hardware configuration, while more complex protocols define timing, data formats, error detection and correction techniques and software structures.

Computer networks almost universally employ multiple layers of protocols. A low-level physical layer protocol assures the transmission and reception of a data stream between two devices. Data packets are constructed in a data link layer. Over the physical layer, a network and transport layer protocol governs transmission of data through the network, thereby ensuring end-to end reliable data delivery.

The most common physical networking protocol or topology for small networks is Ethernet, developed by Xerox. When a node possesses a packet to be transmitted through the network, the node monitors the backbone and transmits when the backbone becomes clear. There is no central backbone master device to grant requests to gain access to the backbone. While this type of multipoint topology facilitates rapid transmission of data when the backbone is lightly utilized, packet collisions may occur when the backbone is heavily utilized. In such circumstances, there is a greater chance that multiple nodes will detect that the backbone is clear and transmit their packets coincidentally. If packets are impaired in a collision, the packets are retransmitted until transmission is successful.

Another conventional physical protocol or topology is Token Ring, developed by IBM. This topology employs a "token" that is passed unidirectionally from node to node around an annular backbone. The node possessing the token is granted exclusive access to the backbone for a single packet transfer. While this topology reduces data collisions, the latency incurred while each node waits for the token translates into a slower data transmission rate than Ethernet when the network is lightly utilized.

As computer networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

Bridges may be designed to operate in the MAC sublayer. Further details may be found in "MAC Bridges," P802.1D/ D6, September 1988, a draft publication of IEEE Project 802 on Local and Metropolitan Area Network Standards, or in later drafts of this document.

The basic function of a bridge is to listen "promiscuously," i.e., to all message traffic on all LANs to which it is connected, and to forward each message it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater.

As network topologies become more complex, with large numbers of LANs, and multiple bridges interconnecting them, operational difficulties can ensue if all possible LAN bridging connections are permitted. In particular, if several LANs are connected by bridges to form a closed loop, a message may be circulated back to the LAN from which it was originally transmitted, and multiple copies of the same message will be generated. In the worst case, messages will be duplicated to such a degree that the networks will be effectively clogged with these messages and unable to operate at all.

To prevent the formation of closed loops in bridged networks, IEEE draft publication P802.1D, referred to above, proposes a standard for a spanning tree algorithm that will connect the bridged network into a tree configuration, containing no closed loops, and spanning the entire network configuration. The spanning tree algorithm is executed periodically by the bridges on the interconnected network, to ensure that the tree structure is maintained, even if the physical configuration of the network changes. Basically, the bridges execute the spanning tree algorithm by sending special messages to each other to establish the identity of a "root" bridge. The root bridge is selected, for convenience, as the one with the smallest numerical identification. The algorithm determines which links of the bridges are to be active and which are to be inactive, i.e., disabled, in configuring the tree structure. One more piece of terminology is needed to understand how the algorithm operates. Each LAN has a "designated" link, which means that one of the links connectable to the LAN is designated to carry traffic toward and away from the root bridge. The basis for this decision is similar to the basis for selecting the root bridge. The designated link is the one providing the least costly (shortest) path to the root bridge, with numerical bridge identification being used as a tie-breaker. Once the designated links are identified, the algorithm chooses two types of links to be activated or closed: first, for each LAN its designated link is chosen, and second, for each bridge a link that forms the "best path" to the root bridge is chosen, i.e., a link through which the bridge received a message giving the identity of the root bridge. All other links are inactivated. Execution of the algorithm results in interconnection of the LANs and bridges in a tree structure, i.e., one having no closed loops.

The "Internet" is a collection of networks, including Arpanet, NSFnet, regional networks such as NYsernet, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet. The specific services that these protocols provide are not important to the present invention, but include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

TCP/IP frequently uses a slight deviation from the seven-layer OSI model in that it may have five layers. These five layers are combinations and derivatives of the seven-layer model as shown in FIG. 1. The five layers are as follows:

Layer 5—The Application Layer. Applications such as ftp, telnet, SMTP, and NFS relate to this layer.

Layer 4—The Transport Layer. In this layer, TCP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue, as is shown in FIG. 2. As a message is sent from the first host to the second, gateways pass the packet along by stripping off lower layers, readdressing the lower layer, and then passing the packet toward its final destination.

A router, like a bridge, is a device connected to two or more LANs. Unlike a bridge, however, a router operates at the network layer level, instead of the data link layer level. Addressing at the network layer level makes use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e., no two hosts, wherever located, have the same data link layer address. There is a protocol called ARP (address resolution protocol), which obtains a data link layer address from the corresponding network layer address (the address that IP uses). Typically, each router maintains a database table from which it can look up the data link layer address, but if a destination host is not in this ARP is database, the router can transmit an ARP request. This message basically means: "will the host with the following network layer address please supply its data link layer address." Only the addressed destination host responds, and the router is then able to insert the correct data link layer address into the message being forwarded, and to transmit the message to its final destination.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (the destination network is directly attached to the current host) the new address will be the same as the destination address in the IP header.

The next hop address defined by the method above is not stored in their IP datagram. There is no reserved space to hold it and it is not "stored" at all. After executing the routing algorithm (the algorithm is specific to the vendor/platform) to define the next hop address to the final destination. The IP protocol software passes the datagram and the next hop address to the network interface software responsible for the physical network over which the datagram must now be sent.

The network interface software binds the next hop address to a physical address (this physical address is discovered via address resolution protocols (ARP, RARP, etc.), forms a frame (Ethernet, SMDS, FDDI, etc.—OSI layer 2 physical address) using the physical address, places the datagram in the data portion of the frame, and sends the result out over the physical network interface through which the next hop gateway is reached. The next gateway receives the datagram and the foregoing process is repeated.

In addition, the IP does not provide for error reporting back to the source when routing anomalies occur. This task is left to another Internet protocol, the Internet Control Message Protocol (ICMP).

A router will perform protocol translation. One example is at layers 1 and 2. If the datagram arrives via an Ethernet interface and is destined to exit on a serial line, for example, the router will strip off the Ethernet header and trailer, and substitute the appropriate header and trailer for the specific network media, such as SMDS, by way of example.

A route policy may be used instead of routing table entries to derive the next hop address. In the system and methodology of the present invention, the source address is tested to see in which ISP address range it falls. Once the ISP address range is determined the packet is then routed to the next hop address associated with the specific ISP.

Data communications network services have two categories of call establishment procedures: connection-oriented and connectionless.

Connection-oriented network services require that users establish a single distinct virtual circuit before the data can be transmitted. This circuit then defines a fixed path through the network that all traffic follows during the session. Several packet switching services are connection-oriented, notably X.25 and Frame Relay. X.25 is the slower of the services, but has built-in error correction—enough for its performance not to depend on clean, high-quality optical fiber lines. Frame relay, regarded as the first generation of fast packet technology, is well-suited for high-speed bursty data communication applications.

Connectionless network services, by contrast, let each packet of a communications session take a different, independent path through the network. One example is the Switched Multimegabit Data Service (SMDS), a possible precursor to broadband ISDN. This fast-packet service supports data rates ranging from the T1 rate of 1.544 Mb/s up to 1 Gb/s. The SMDS transport system architecture is defined by IEEE 802.6 Metropolitan Area Network standards.

Eventually, SMDS is expected to operate at rates of 51.85 Mb/s to 9.953 Gb/s specified by the family of standards known in North America as Synchronous Optical Network (SONET). Synchronous Digital Hierarchy (SDH) is an ITU recommendation that grew out of and includes the specifications of SONET.

The process of routing packets over the Internet is also considered a connectionless network service. The Internet Protocol (IP) addresses packets from sender to receiver. It is still used mostly in conjunction with the Transmission Control Protocol (TCP), which establishes a connection between end users to manage the traffic flow and ensures the data are correct, providing end-to-end reliability. The combination, known as TCP/IP, is the Internet's main backbone protocol suite.

Telephone Network Control

All telecommunications systems having multiple switching offices require signaling between the offices. Telephone networks require signaling between switching offices for transmitting routing and destination information, for transmitting alerting messages such as to indicate the arrival of an incoming call, and for transmitting supervisor information, e.g., relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. As shown by this example, in-band signaling greatly increases congestion on the traffic channels, that is to say, the voice channels in the voice telephone network example. In-band signaling also is highly susceptible to fraud because hackers have developed devices which mimic in-band signaling.

Out-of-band signaling evolved to mitigate the problems of in-band signaling. Out-of-band signaling utilizes separate channels, and in many cases separate switching elements. As such, out-of-band signaling reduces congestion on the channels carrying the actual communication traffic. Also, messages from the end users always utilize an in-band format and remain in-band, making it virtually impossible for an end user to simulate signaling messages which ride on an out-of-band channel or network. Out-of-band signaling utilizes its own signal formats and protocols and is not constrained by protocols and formats utilized for the actual communication, therefore out-of-band signaling typically is considerably faster than in-band signaling.

Out of band signaling networks typically include data links and one or more packet switching systems. Out-of-band signaling for telephone networks is often referred to as Common Channel Signaling (CCS) or Common Channel Interoffice Signaling (CCIS). Most such signaling communications for telephone networks utilize signaling system 7 (SS7) protocol. An SS7 compliant CCIS network comprises data switching systems designated Signal Transfer Points (STPs) and data links between the STPs and various telephone switching offices of the network. In advanced versions of the telephone network including high level control nodes, identified as Service Control Points (SCPs) or Integrated Service Control Points (ISCPs), the CCIS network also includes data links connecting the high level control nodes to one or more of the STPs.

The STPs are program controlled packet data switching systems. In operation, an STP will receive a packet data message from another node of the network, for example from an end office switching system. The STP analyzes point code information in the packet and routes the packet according to a translation table stored within the STP. This translation table is static. Any packet having a particular point code is output on a port going to the next CCIS signaling node specified by translation of that point code.

The development of the CCIS network has recently permitted the offering of a number of new service features provided by centralized program control from a high level control point. Such an enhanced telephone network is often termed an Advanced Intelligent Network (AIN). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via the CCIS signaling network to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An AIN type network for providing an Area Wide Centrex service was disclosed and described in detail in commonly assigned U.S. Pat. No. 5,247,571 to Kay et al., the disclosure of which is entirely incorporated herein by reference. Existing AIN type systems, such as disclosed in the Kay et al. Patent, utilize the routing functionality of the STPs in the CCIS network as described above. Every time a specified switching office launches a query for an identified ISCP, the translation table in the STP(s) of the CCIS network causes the STP(s) to route the query message to that ISCP.

The CCIS and AIN which have been described provide effective and efficient connection oriented signaling between switches in modern telephone networks. However, such control is not available in the United States on a nationwide basis and is not available internationally for a variety of reasons. Connections between Interexchange Carriers (IXCs) and Local Exchange Carriers (LECs) in the United States are still made to a significant extent with in-band signaling. This requires inefficient use of circuit time of voice trunks and is vulnerable to fraud. The inefficiencies are particularly aggravated where international and particularly transoceanic communications are involved.

Disclosure of the Invention

Objects of the Invention

It is an object of the present invention to provide telephone service over wide areas between different telephone systems and carriers using a new form of common channel signaling architecture which permits use of existing telecommunication signaling control facilities in conjunction with existing and readily available world wide connectionless data networks.

It is a further object of the invention to provide such a telecommunications system and service in a manner which obviates any need for installation of end to end connection oriented common channel signaling facilities.

It is another object of the invention to provide telephone service over wide areas between different telephone systems and carriers using common channel signaling which uses existing telecommunication control facilities in conjunction with existing open access, non-proprietary world wide data networks.

It is a still further object of the invention to provide a new method and system utilizing an architecture in which a destination telecommunications network having common channel signaling control is connected to an originating telecommunications network having common signaling control through a call set up methodology which provides ad hoc connection between the two spaced common channel signaling networks via an unrelated world wide data network which preferably constitutes the Internet.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention provides a novel system and method for controlling on a worldwide basis two or more telecommunications networks which are themselves capable of exercising a form of common channel signaling network control. The new system and method do not require that the controlled networks be adjoining, nor do they require that they be linked by intervening networks which have common channel signaling network control. The invention is particularly advantageous in providing telecommunications connectings between transoceanic networks. The new method and system use an architecture in which a destination telecommunications network having common channel signaling control is connected to an originating telecommunications network having common signaling control through a call set up methodology which provides ad hoc connection between the two spaced common channel signaling networks via an unrelated world wide data network which preferably constitutes the Internet. Through this arrangement the normal CCIS signaling of the two spaced networks can be effectively utilized virtually without change to obtain the advantages of common channel signaling which are known to those skilled in the art. The invention provides multiple embodiments and permits call set up with virtually no usage of common channel signaling in the originating telecommunications network. According to another embodiment the advance features of an Advanced Intelligent Network (AIN) may be provided from a central control extraneous to the two telecommunications networks.

BEST MODE FOR CARRYING OUT THE INVENTION

To facilitate understanding of the present invention, it will be helpful first to review the architecture and operation of a telephone network having CCIS capabilities.

Figure 1:
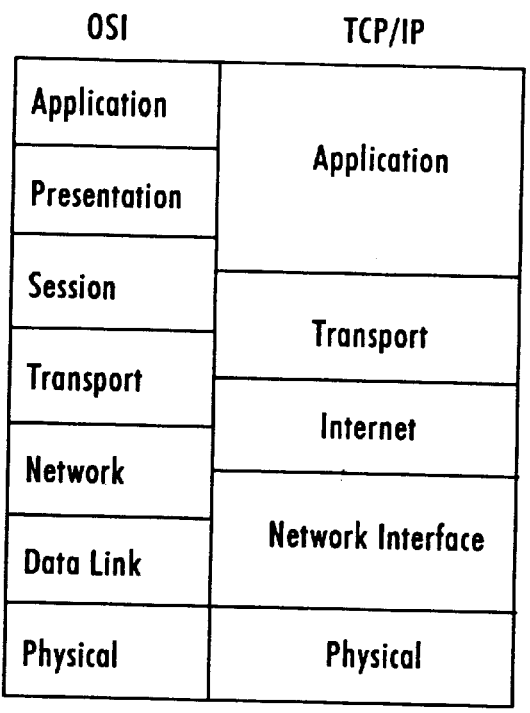
FIG. 1 is a comparative diagram of the International Standards Organization (ISO) Open System Interconnection (OSI) model for network architectures and a commonly used TCP/IP model.
Figure 2:
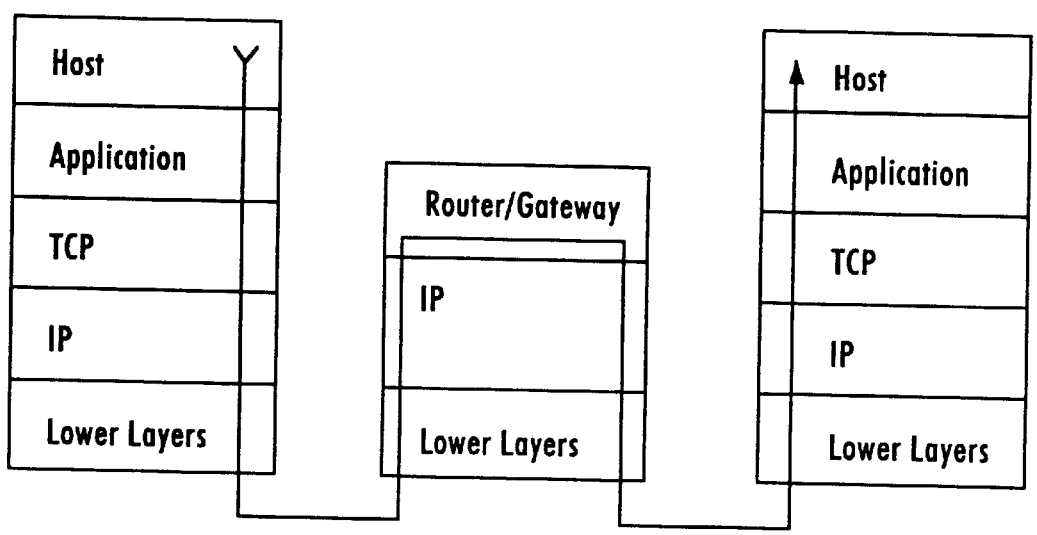
FIG. 2 is a simplified block diagram illustrating the passage of a packet from an initiating host to a receiving host through a gateway using the TCP/IP model.
Figure 3:
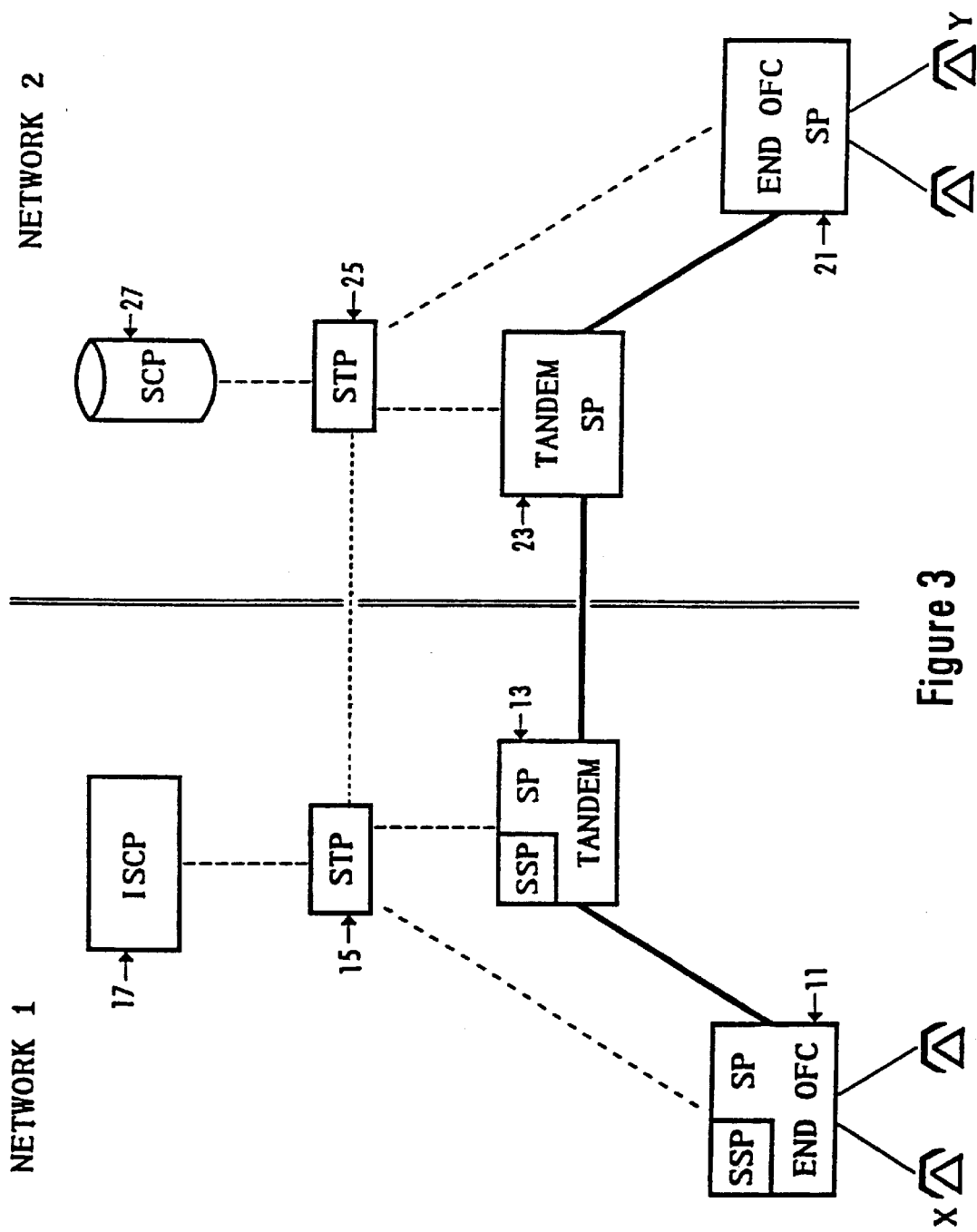
FIG. 3 is a simplified block diagram of a Public Switched Telephone Network and its SS7 signal control network.

Referring to FIG. 3 there is shown a simplified block diagram of a switched traffic network and the common channel signaling network used to control the signaling for the switched traffic network. In the illustrated example, the overall network actually comprises two separate networks 1 and 2. As shown, these networks serve different regions of the country and are operated by different local exchange carriers. Alternatively, one network may be a local exchange carrier network, and the other network may comprise an interexchange carrier network. Although the signaling message routing of the present invention will apply to other types of networks, in the illustrated example, both networks are telephone networks.

In FIG. 3, a first local exchange carrier network 1 includes a number of end office switching systems providing connections 40 local communication lines coupled to end users telephone station sets. For convenience, only one end office 11 is shown. The first local exchange carrier network 1 also includes one or more tandem switching systems providing connections between offices. For convenience, only one tandem office 13 is shown. As such, the first telephone network consists of a series of switching offices interconnected by voice grade trunks, shown as solid lines. One or more trunks also connect the tandem 13 to one or more switches, typically another tandem office, in the second network 2.

Each switching office has SS7 signaling capability and is conventionally referred to as a signaling point (SP) in reference to the SS7 network. In the first network 1, each switching office 11, 13 also is programmed to recognize identified events or points in call (PICs). In response to a PIC, either office 11 or 13 triggers a query through the signaling network to an Integrated Service Control Point (ISCP) for instructions relating to AIN type services. Switching offices having AIN trigger and query capability are referred to as Service Switching Points (SSPs). The ISCP 17 is an integrated system shown in more detail in FIG. 8 and discussed more fully below.

The end office and tandem switching systems typically consist of programmable digital switches with CCIS communications capabilities. One example of such a switch is a 5ESS type switch manufactured by AT&T; but other vendors, such as Northern Telecom and Siemens, manufacture comparable digital switches which could serve as the SPs.

Within the first network 1, the common channel interoffice signaling (CCIS) network includes one or more Signaling Transfer Points (STPs) and data links shown as dotted lines between the STP(s) and the switching offices. A data link also connects the STP 15 to the ISCP 17. One or more data links also connect the STP(s) 15 in the network 1 to those in networks of other carriers, for example to the STP 25 in the network 2.

Although shown as telephones in FIG. 3, the terminal devices can comprise any communication device compatible with the local communication line. Where the line is a standard voice grade telephone line, for example, the terminals could include facsimile devices, modems etc.

The network 2 is generally similar in structure to the network 1. The network 2 includes a number of end office SP type switching systems 21 (only one shown) as well as one or more tandem switching systems 23 (only one shown). The network 2 includes a CCIS network comprising one or more STPs 25 and data links to the respective SP type switching offices and to the CCIS system of other carriers networks.

In the illustrated example, the second network 2 is not a full AIN type network. The switching systems do not have full AIN trigger and query capabilities. The network 2 includes a Service Control Point (SCP) 27, but the routing tables utilized in that database are more limited than those in the ISCP 17. The switching systems 21, 23 can query the SCP 27 for routing information, but the range of trigger events are more limited, e.g., to 800 number call processing.

An end office switching system 11 or 21 shown in FIG. 3 normally responds to a service request on a local communication line connected thereto, for example an off-hook followed by dialed digit information, to selectively connect the requesting line to another selected local communication line. The connection can be made locally through only the connected end office switching system but typically will go through a number of switching systems. For example, when a subscriber at station X calls station Y, the connection is made through the end office switching system 11, the tandem offices 13 and 23 and the end office switching system 21 through the telephone trunks interconnecting the various switching offices.

In the normal call processing, the central office switching system responds to an off-hook and receives dialed digits from the calling station. The central office switching system analyzes the. received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signaling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system, switching system 11 in the present example, suspends the call and sends a message through the CCIS network to the end office switching system serving the destination telephone line, i.e., to a terminating end office 21. The terminating end office determines whether or not the called station Y is busy. If the called station is busy, the terminating end office 21 so informs the originating end office 11 via CCIS message, and the originating end office provides a busy signal to the calling station. If the called station Y is not busy, the terminating end office 21 so informs the originating end central office 11. A telephone connection is then constructed via the trunks and end offices (and/or tandem offices) of the network between the calling and called stations.

For an AIN type service, such as call redirection based on data stored in the ISCP 17, the end offices and/or tandems are SSP capable and detect one of a number of call processing events, each identified as a 'point in call' (PIC), to trigger AIN type processing. Specifically, in response to such a PIC, a tandem 13 or end office switching system 11 suspends call processing, compiles a call data message and forwards that message via common channel interoffice signaling (CCIS) links and one or more STPs 15 to an ISCP 17. If needed, the ISCP 17 can instruct the particular switching office to obtain and forward additional information. Once sufficient information has reached the ISCP 17, the ISCP 17 accesses its stored data tables to translate the received data into a call control message and returns the call control message to the switching office via the STP 15 and the appropriate CCIS links. The office uses the call control message to complete the particular call through the public switched network in the manner specified by the subscriber's data file in the ISCP 17.

The SCP 27 offers a similar capability in the network 2, but the range of service features offered by that database are more limited. Typically, the SCP 27 offers only 800 number calling services with a limited number of related call routing options. The triggering capability of the tandem 23 and end office 21 is limited to 800 number recognition. If the end office 21 is capable of 800 number recognition and CCIS communication with the SCP 27, as shown, then the office 21 launches a CCIS query to the SCP 27 in response to dialing of an 800 number at a station set Y. The SCP 27 translates the dialed 800 number into an actual destination number, for example the telephone number of station X, and transmits a CCIS response message back to end office 21. End office 21 then routes the call through the public network to the station X identified by the number sent back by the SCP 27, using CCIS call routing procedures of the type discussed above.

Figure 4:
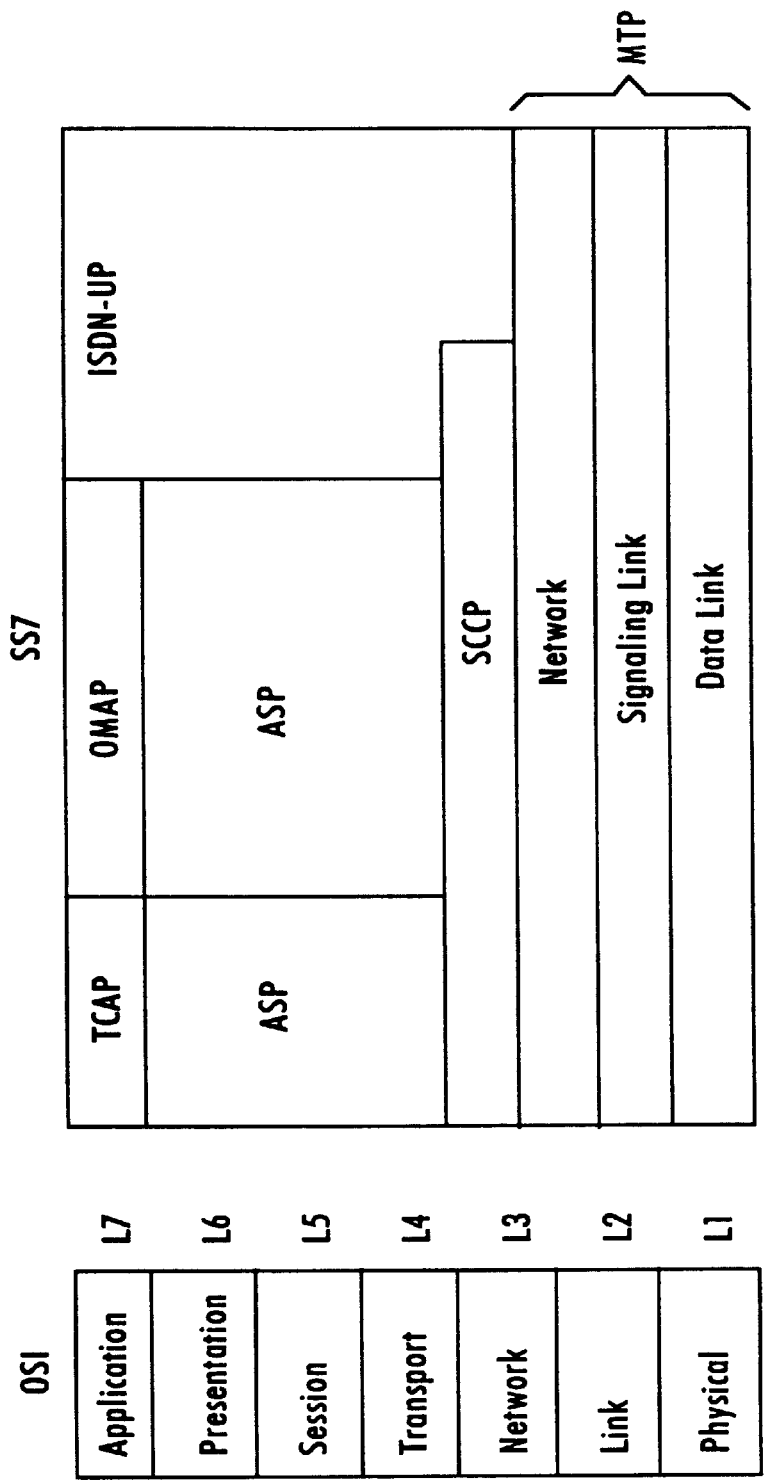
FIG. 4 depicts the protocol stack for SS7 and comparison thereof to the OSI model.

SS7 signaling protocol is based on the OSI model. International Standards Organization (ISO) Open Systems Interconnection (OSI) reference model specifies a hierarchy of protocol layers and defines the function of each layer in the network. FIG. 4 shows the OSI model and the relationship thereof to the protocol stack for SS7. The lowest layer defined by the OSI model is the physical layer (L1). This layer provides transmission of raw data bits over the physical communication channel through the particular network. The layer next to the physical layer is the data link layer (L2) . The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g., set-up and tear-down of connections.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM), an Address Complete Message (ACM) and an Answer Message (ANM)

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices and databases in each network, is assigned a 9-digit point-code for purposes of addressing signaling messages through the CCIS network. Both the SCCP protocol and the MTP processing utilize these point codes.

Figures 5, 6:
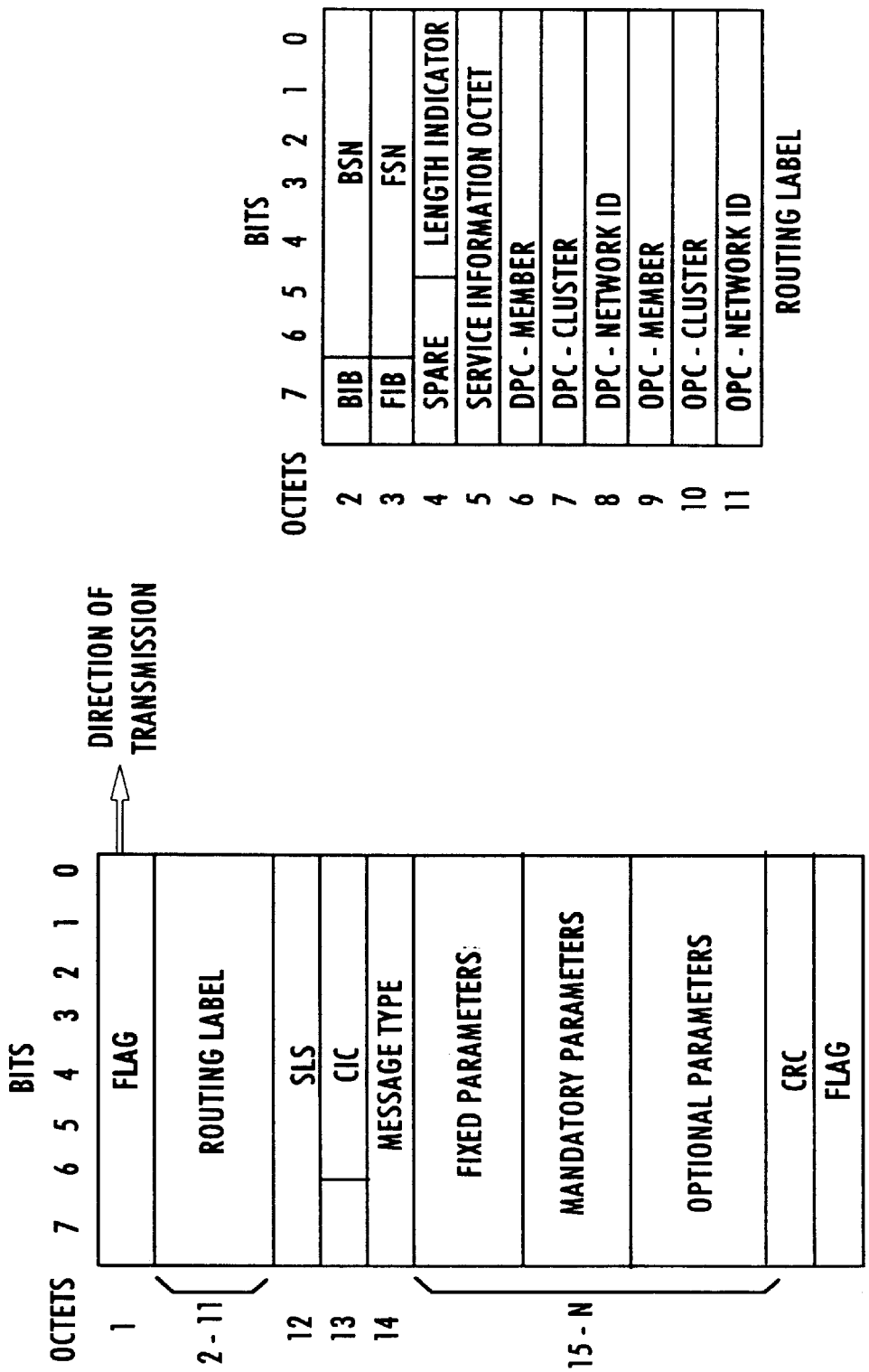
FIG. 5 illustrates in graphic form the layout of an SS7 protocol message packet.
FIG. 6 illustrates in graphic form the layout of the routing label portion of the SS7 protocol message packet shown in FIG. 5.

The SS7 messages traverse the network at all times. The messages themselves comprise digital serial messages that come into the STP. FIG. 5 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 4. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15-N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

FIG. 6 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. The destination or 'called party' address includes octets 6, 7 and 8. Octets 9–11 carry origination point code information, for example member, cluster and network ID information.

In the example shown in FIG. 6, the three octets of the called party address contain an actual destination point code (DPC) identified as DPC-member, DPC-cluster and DPC-network ID information. In operation, the translation tables stored in the STP cause the STP to actually route based on the DPC without translating any of the DPC octets into new values. The called party address octets (6–8), however, may carry other types of called party addressing information and receive different treatment by the STP. For example, these, octets may carry a global title (GTT) and subsystem number (SSN) information.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

Figure 7A:
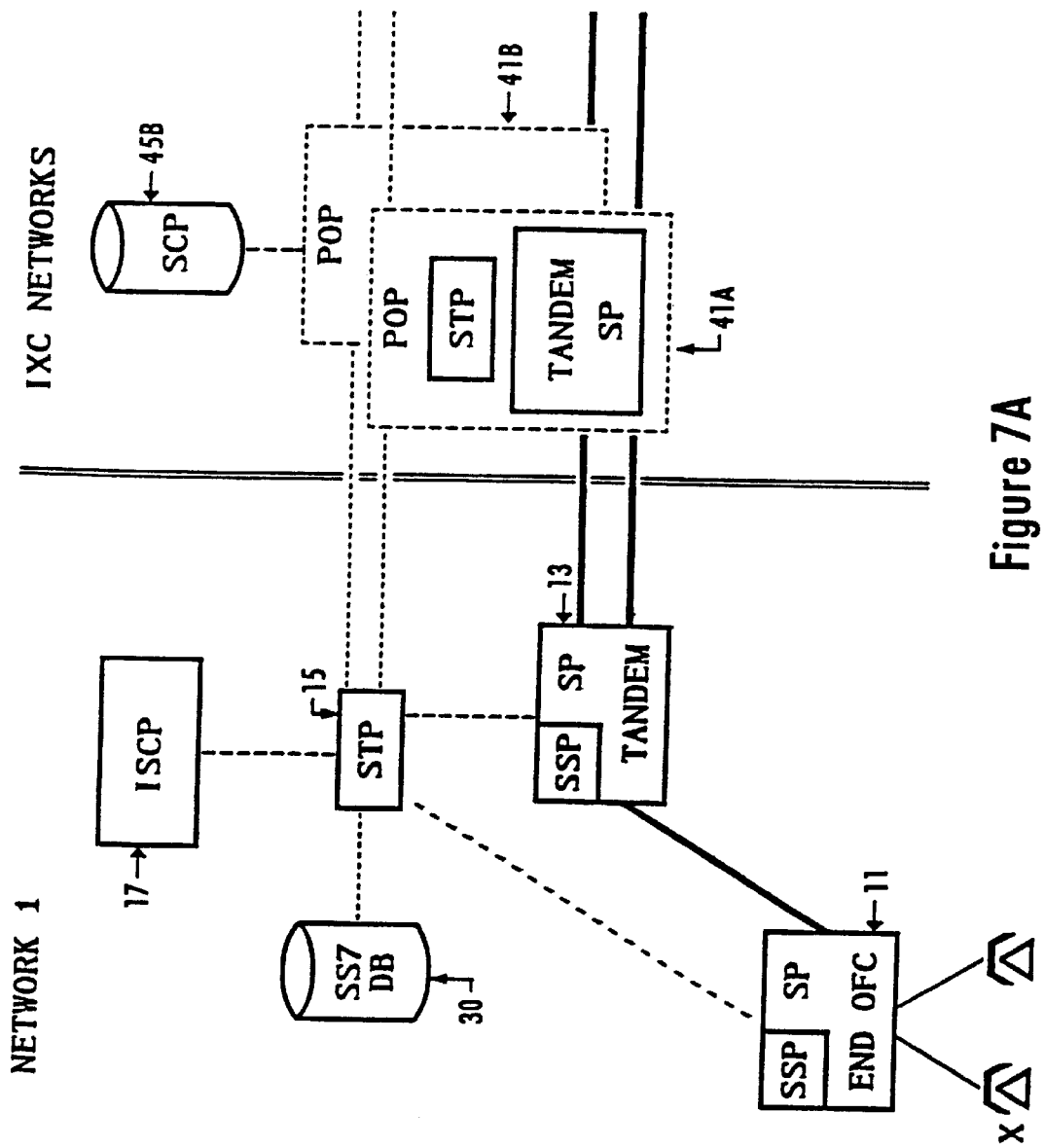
FIGS. 7A and 7B together show a somewhat more detailed block diagram of the network, i.e., including two interexchange carrier networks.
Figure 7B:
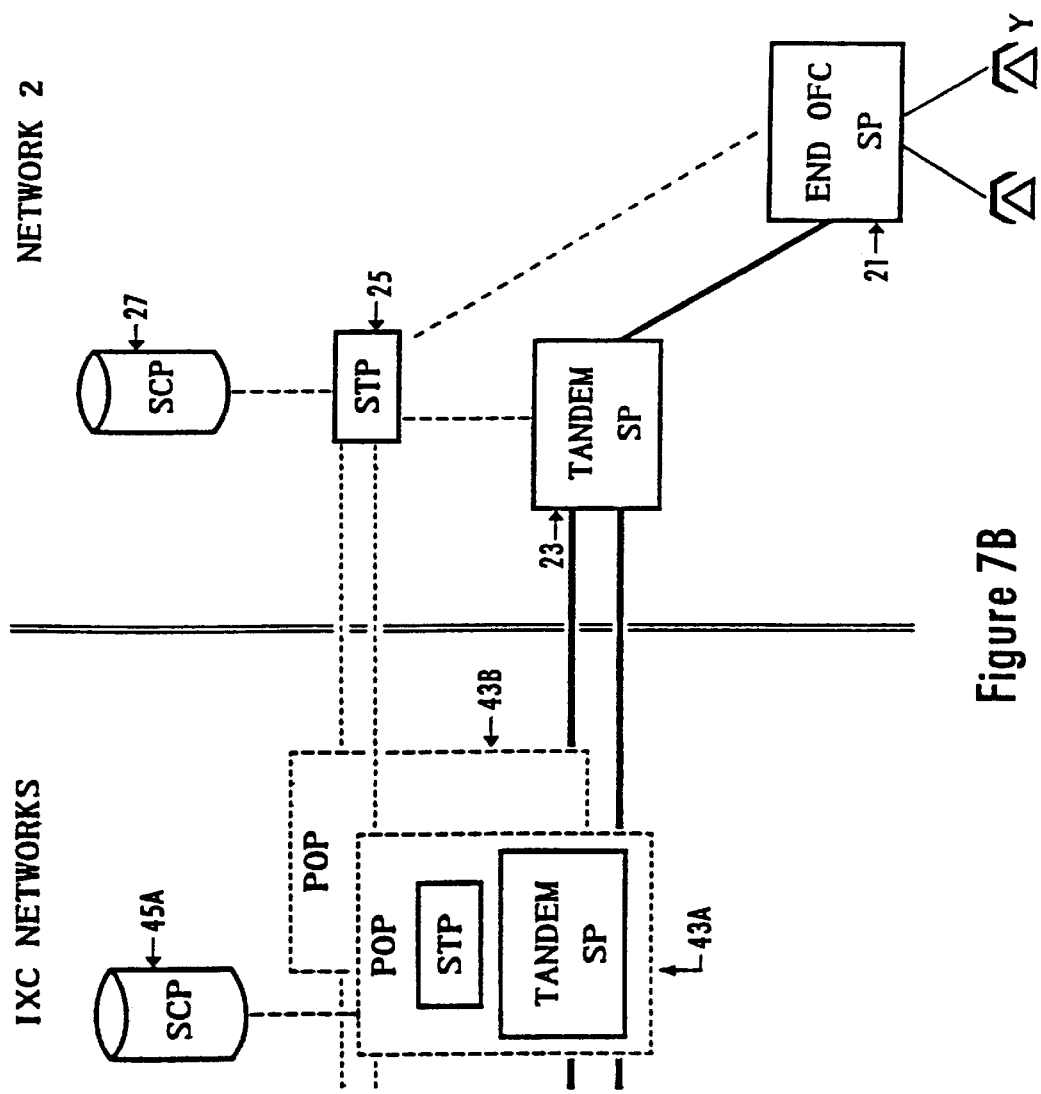

FIGS. 7A and 7B together show a public switched telephone network similar to that of FIG. 3. Again, the network actually includes two local exchange carrier networks, 1 and 2, and the structure and general methods of operation of those networks are identical to those of the networks 1 and 2 shown in FIG. 3. FIGS. 7A and 7B, however, add a high level functional representation of two competing interexchange carrier networks.

Each local exchange carrier network operates within boundaries of a defined Local Access and Transport Area (LATA). Current laws require that interexchange carriers, not local exchange carriers, must transport calls crossing the LATA boundaries, i.e., all interLATA calls. To transport calls from one LATA to another, each interexchange carrier network includes a point of presence (POP) 41A, 41B in the region of the first local exchange carrier network 1 and a point of presence (POP) 43A, 43B in the region of the second local exchange carrier network 2. Although not shown in detail, the interexchange carrier will operate a network of communication links and switching offices to provide transport between the POPs in different LATAs.

The interexchange carrier networks provide two-way transport for both communication traffic (e.g., voice calls) and signaling. For CCIS type processing, the POP in each region will include both a tandem type switch with at least SS7 signaling point (SP) capability as well as an STP. In each POP, the tandem connects to a switching office in the respective local exchange carrier network, and the STP connects to an STP of the respective local exchange carrier network. In the illustrated simplified example, the tandem switches in POPs 41A, 41B connect to the tandem 13 in network 1. The STPs in POPs 41A, 41B connect to the STP 15 in network 1. Similarly, the tandem switches in POPs 43A, 43B connect to the tandem 23 in network 2, and the STPs in those POPs connect to the STP 25 in network 2.

Typically, each interexchange carrier will operate an SCP database 45A, 45B. The SCP 45A, 45B connects to a signal transfer point (STP) at some point in each respective interexchange carrier's network. In the illustrated example, the SCP 45B connects to an STP in POP 41B, and the SCP 45A connects to the STP in POP 43A. The SCPs provide data translations for 800 number calling services and the like offered by the interexchange carriers. If an interexchange carrier chooses, one or more of the carrier's tandems may have full SSP capability, and the SCP could be replaced by an ISCP to offer AIN type services to the interexchange carrier's customers. The precise arrangement of switches, trunks, STPs, signaling links and SCPs or the like vary between interexchange carriers depending on the traffic load each transports, the sophistication of services provided, etc.

Figure 8:
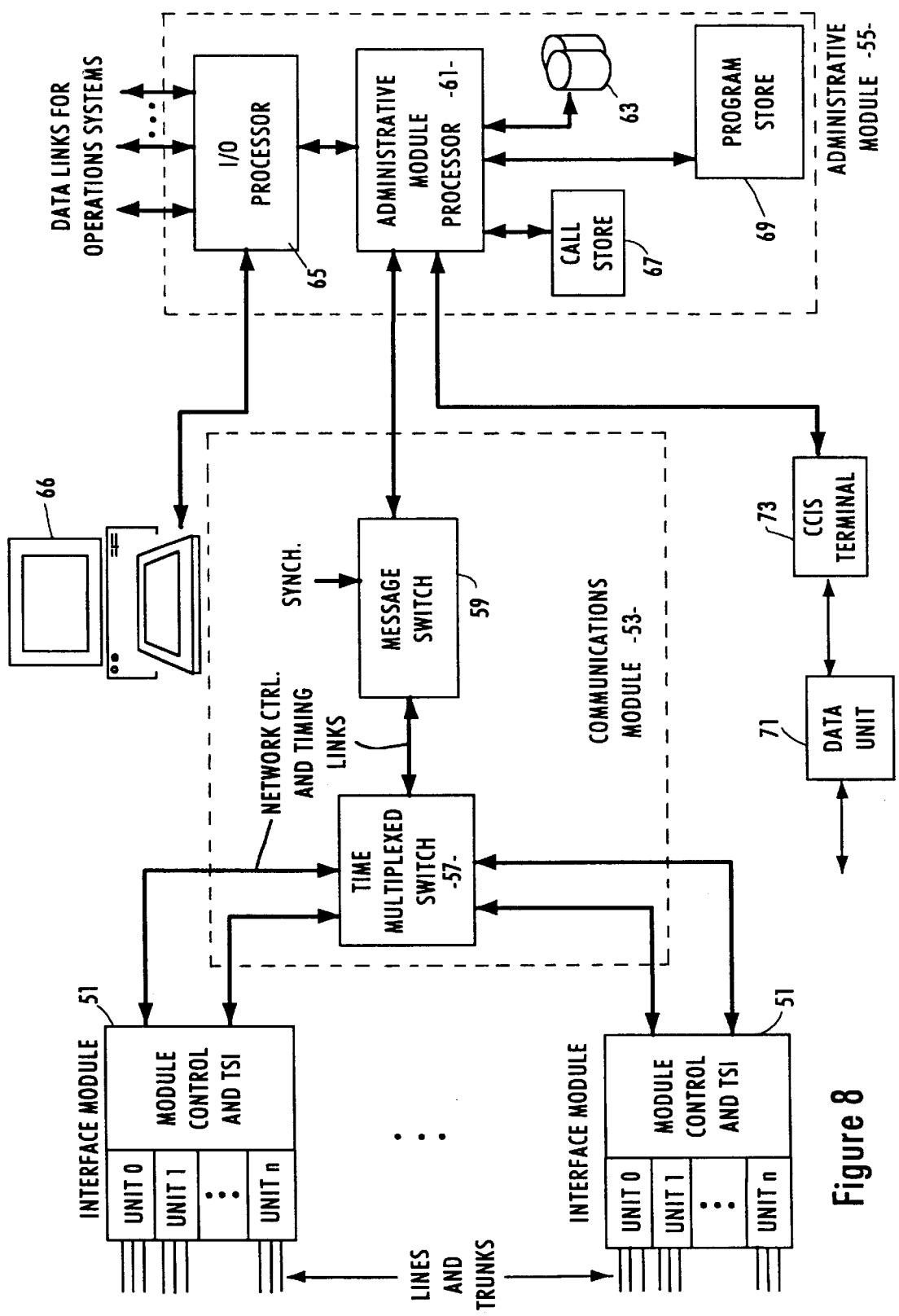
FIG. 8 is a more detailed diagram of one of the switching systems.

FIG. 8 is a simplified block diagram of an electronic program controlled switch which may be used as any one of the SP or SSP type switching offices in the systems of FIG. 3 or FIGS. 7A–7B. As illustrated, the switch includes a number of different types of modules. In particular, the illustrated switch includes interface modules 51 (only two of which are shown), a Communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. The interface modules for the analog lines also include dial pulse detectors and dual tone multifrequency (DTMF) detectors. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of operations of the switching office. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signaling link between the administrative module processor 61 and an STP of the SS7 signaling network, for facilitating call processing signal communications with other central offices (COs) and with one or more of the SCPs and/or the ISCP 17.

As illustrated in FIG. 8, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

Of particular note, the translation data in the disc storage 63 includes translation information needed to address messages for transmission through the signaling network. In particular, when the switch needs to send a message through the SS7 network to a particular node, the data from the disc storage 63 provides the global title and/or point code for the message destination.

Figure 9:
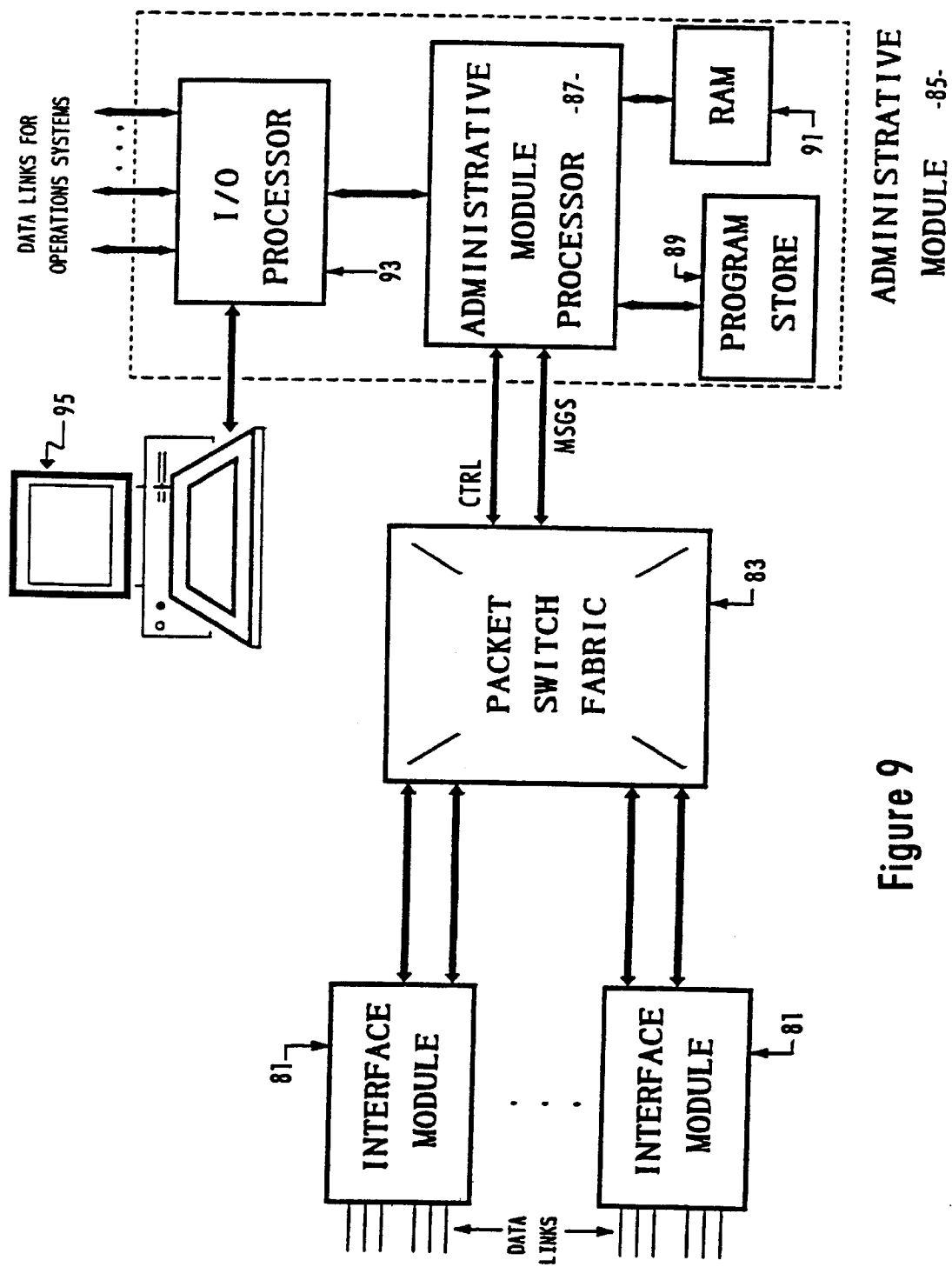
FIG. 9 is a more detailed diagram of one of the signal transfer points.

FIG. 9 depicts the functional elements of one of the STPs shown in the networks of FIGS. 3, 7A and 7B. As shown, the STP comprises interface modules 81, a packet switch fabric 83 and an administrative module 85. The interface modules 81 provide the physical connections to the two-way data links to the switching systems, SCPs, ISCPs and other STPs. Typically, these links provide two-way 56 kbits/s or 64 kbits/s virtual circuits between nodes of the CCIS signaling network. The modules provide a two-way coupling of SS7 data packets, of the type shown in FIG. 3, between the actual data links and the packet switch fabric. The packet switch fabric provides the actual routing of packets coming in from one link, through one of the interface modules 81 back out through one of the interface modules 81 to another data link. The packet switch fabric 83 also switches some incoming messages through to the administrative module 85 and switches some messages from the administrative module 85 out through one of the interface modules 81 to one of the data links.

The administrative module 85 includes an administrative module processor 87, which is a computer equipped with RAM 91 and a program store 89, for overall control of operations of the switching office. Although shown as a logically separate element, the program store 89 typically is implemented as memory within the computer serving as the administrative module processor 87. The administrative module processor 87 provides control instructions to and receives status information from the operation control element (not shown) within the packet switch fabric 83. The administrative module processor 87 also transmits and receives some messages via the packet switch fabric 83 and the interface modules 81. The administrative module 85 also includes one or more input/output (I/O) processors 93 providing interfaces to terminal devices for technicians such as shown at 95 in the drawing and data links to operations systems for traffic recording, maintenance data, etc.

The program store 89 stores program instructions which direct operations of the computer serving as the administrative module processor 87. The RAM 91 stores the translation tables used to control routing and/or processing of messages through the STP. The RAM may be implemented as a disc storage unit, but preferably the RAM comprises a large quantity of semiconductor random access memory circuits providing extremely fast access to information stored therein.

Figure 10:
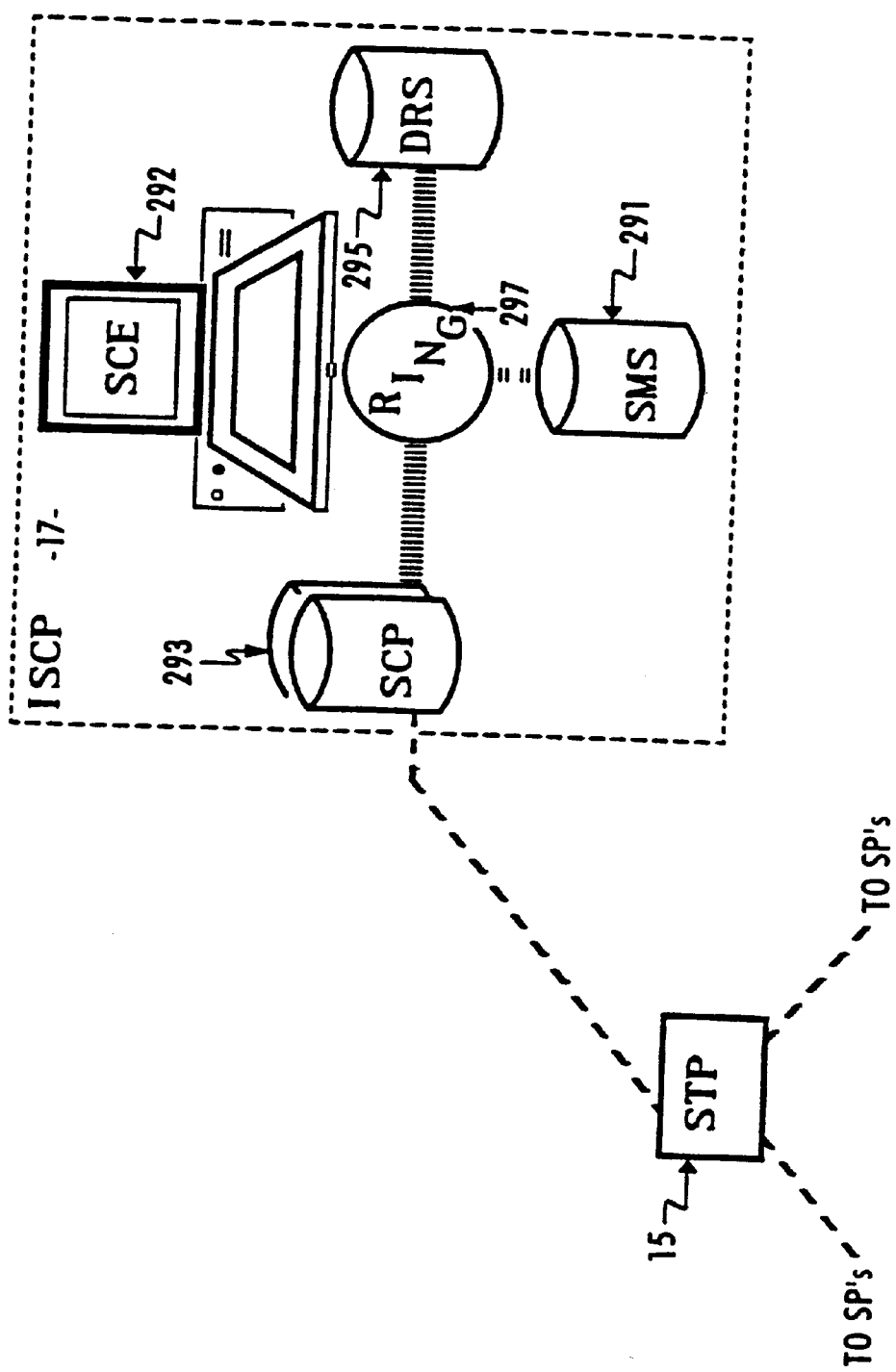
FIG. 10 is a more detailed diagram of an integrated signal control point.

The ISCP 17 is an integrated system, as shown in FIG. 10, Among other system components, the ISCP 17 includes a Service Management System (SMS) 291, a Data and Reporting System (DRS) 295 and the actual database referred to as the Service Control Point (SCP) 293. The ISCP also typically includes a terminal subsystem referred to as a Service Creation Environment or SCE 292 for programming the database in the SCP 293 for the services subscribed to by each individual customer. The components of the ISCP are connected by an internal, high-speed data network, such as a token ring network 297.

Figure 11:
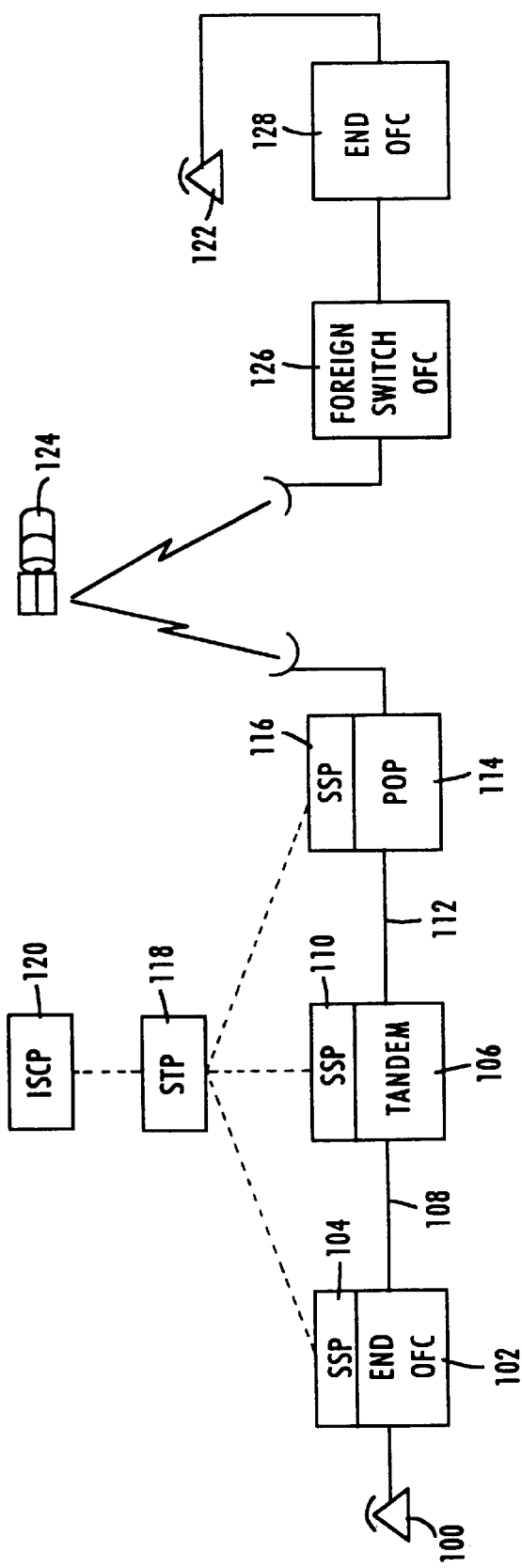
FIG. 11 is a simplified diagram of illustrating the architecture of the existing public switched telephone network (PSTN) in the United States as currently utilized for a typical transoceanic telephone communication.

Referring to FIG. 11 there is shown the architecture of a simplified telephone network of the type shown in FIGS. 3, 7A and 7B as it may currently be utilized for a typical form of transoceanic telephone communication. The subscriber at telephone station 100 in the United States, desiring to make a telephone call to a foreign country, such as Japan, is connected to originating switching office 102 which is SSP equipped as indicated at 104. The switching office 102 is here shown by way of example as connected to tandem office 106 by a trunk 108. The tandem office has SS7 signaling capability and functions as a service switching point as indicated at 110. For simplicity the tandem office is here shown as connected by trunk 112 to an interexchange carrier point of presence (POP) 114. The interexchange carrier switch at the POP is also SSP equipped as shown at 116. The connections from the telephone station 100 and the interexchange carrier point of presence are made through the use of common channel signaling over the CCIS network which is here illustrated as including a signal transfer point (STP) connected by data links to the signal switching points 104, 110, and 116. The signal transfer point 118 is also connected by data link to an ISCP 120.

The use of common channel signaling to effect connection to the destination ends at the point of presence of the interexchange carrier. The interexchange carrier provides connection to the destination telephone station 122 via the satellite link indicated at 124 and foreign switching office 126. The foreign switching office 126 is the point of connection for the Japanese network satellite link. From the switching office 126 connection is made to the destination or end switching office 128 and thence to the Japanese telephone station 122. While the connection between the satellite point of connection switching office 126 and the destination or end switching office 128 has been shown as direct it will be understood by those skilled in the art that there may or may not be one of more intermediate switching offices. In the absence of common channel signaling beyond the United States interexchange carrier point of presence 114, in band signaling must be used with its resulting deficiencies.

Figure 12:
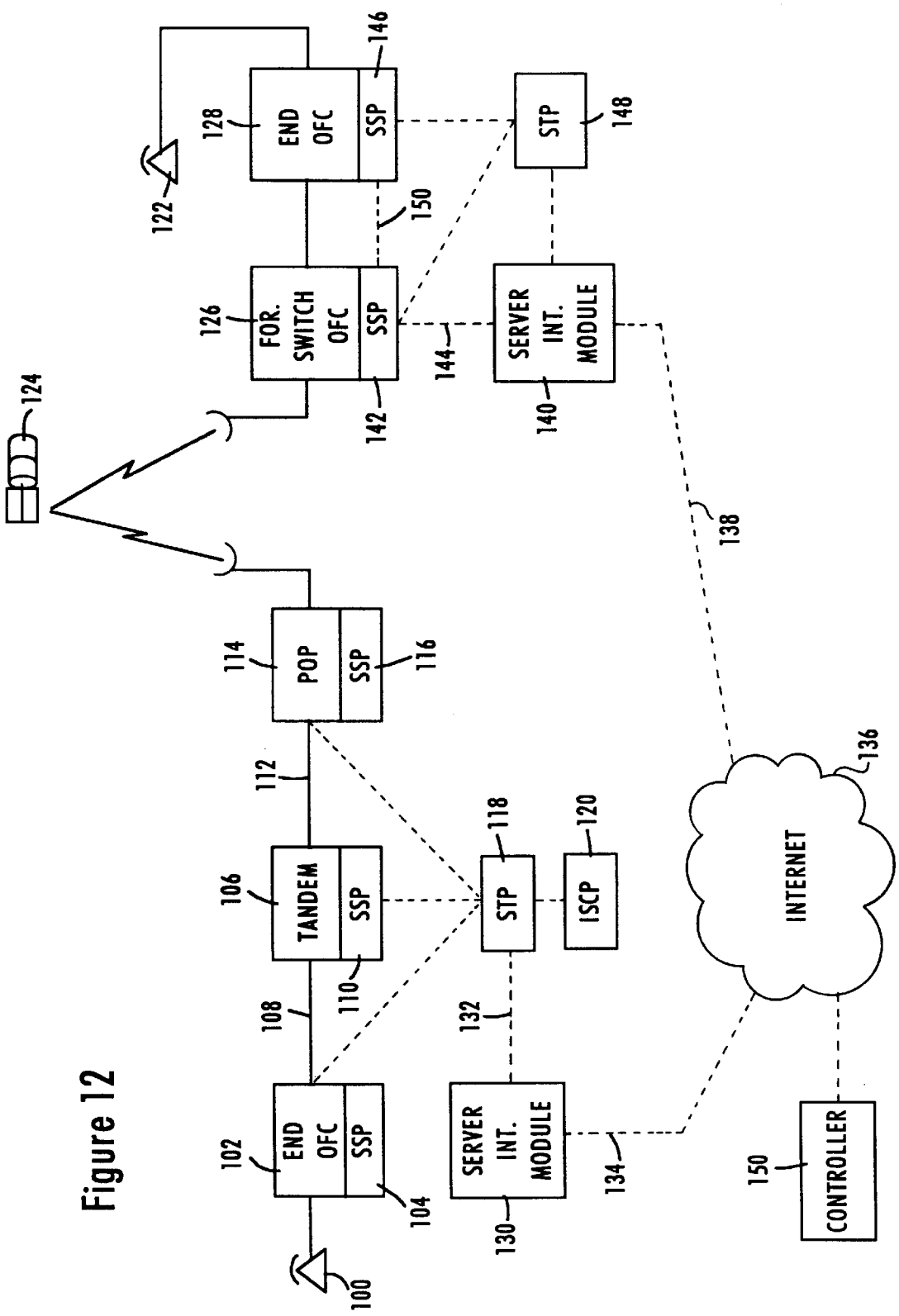
FIG. 12 is a simplified diagram of illustrating the architecture of the existing public switched telephone network (PSTN) in the United States modified according to one embodiment of the invention to implement a transoceanic telephone communication.

FIG. 12 illustrates in simplified block diagram form the architecture of a system capable of overcoming this disadvantage according to one preferred embodiment of the present invention. Referring to that figure there is shown a telecommunications system capable of effecting the transoceanic connection of FIG. 11 without incurring the deficiencies inherent in that system and methodology. FIG. 12 illustrates in its upper portion substantially the same network as shown in FIG. 11 in a different layout and the same reference numerals have been used to refer to the same elements. However FIG. 12 includes additional features to implement end to end control signaling through a virtual link that may be accessed without construction of any new wide area network facilities.

According to the embodiment of the invention illustrated in FIG. 12 the originating end switching office SSP 104 at switching office 102 is associated with an internetwork server module 130. Since the preferred internetwork is the Internet the server module 130 is sometimes referred to as an Internet module. The server 130 is connected by a data link 132, which may be an SS7 link, to the signal transfer point (STP) 118. The actual connection need not be to the specific STP 118 so long as the server is connected to the SS7 CCIS network of the LEC which serves the calling station 100. The server 130 is also connected by data link 134 to the world wide internetwork shown as a cloud 136. The internetwork 136 is preferably the network commonly known as the Internet as presently described in further detail. The far end of the Internet cloud as shown in FIG. 12 is connected via a data link 138 to a server module 140 which is connected to the foreign switching office 126 SSP 142 by data link 144. It is assumed that the foreign switching office is in a telephone network equipped with a common channel signaling system which provides essentially the same capabilities as the SS7 network, as is the case with the Japanese telephone system. Thus FIG. 12 shows connection to SSP 142, STP 148, and SSP 146 in the end switching office 128. Alternatively, the common channel signaling capability may be furnished by F link connection between the switching offices as shown at 150.

Figure 13:
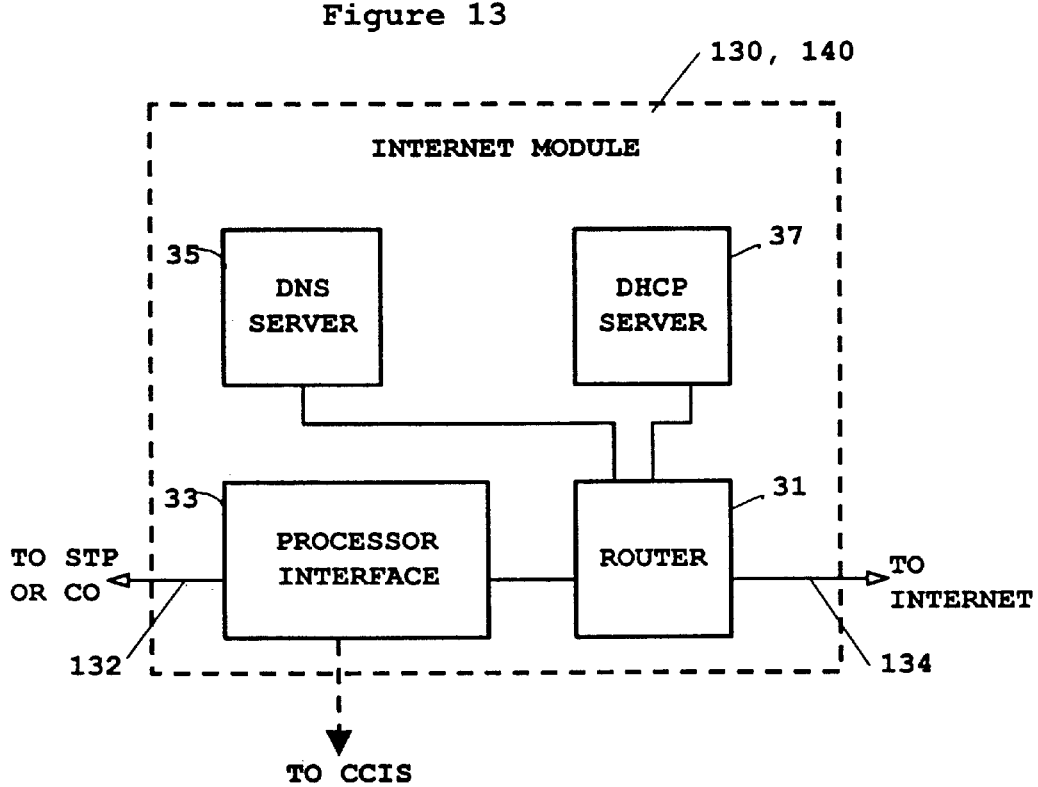
FIG. 13 shows in diagrammatic form the functional architecture of one embodiment of an Internet Module for use in the system illustrated in FIG. 11.

The functional architecture of one embodiment of an Internet Module for use in this system is shown diagrammatically in FIG. 13. The Internet Module, generally indicated at 130 or 140, includes a router 31 of the type now generally used in Internet practice, such as shown in FIG. 13. For performing some functions which may be utilized in the system of FIG. 12 the router may be provided with an interface with processing capability as illustratively shown at 33. Connected to the router are a Domain Name Service (DNS) server 35 and a Dynamic Host Configuration Protocol (DHCP) server 37 of the type conventionally used by Internet Service Providers in existing Internet Service. The router interface is connected to the STP and to the CCIS network while the router is connected to the Internet.

The Internet had its genesis in U.S. Government (called ARPA) funded research which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet and have subsequently become widely used in the industry. TCP/IP is flexible and robust, in effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. It is presently estimated that the growth of the Internet is at a more or less annual doubling rate.

Figure 14:
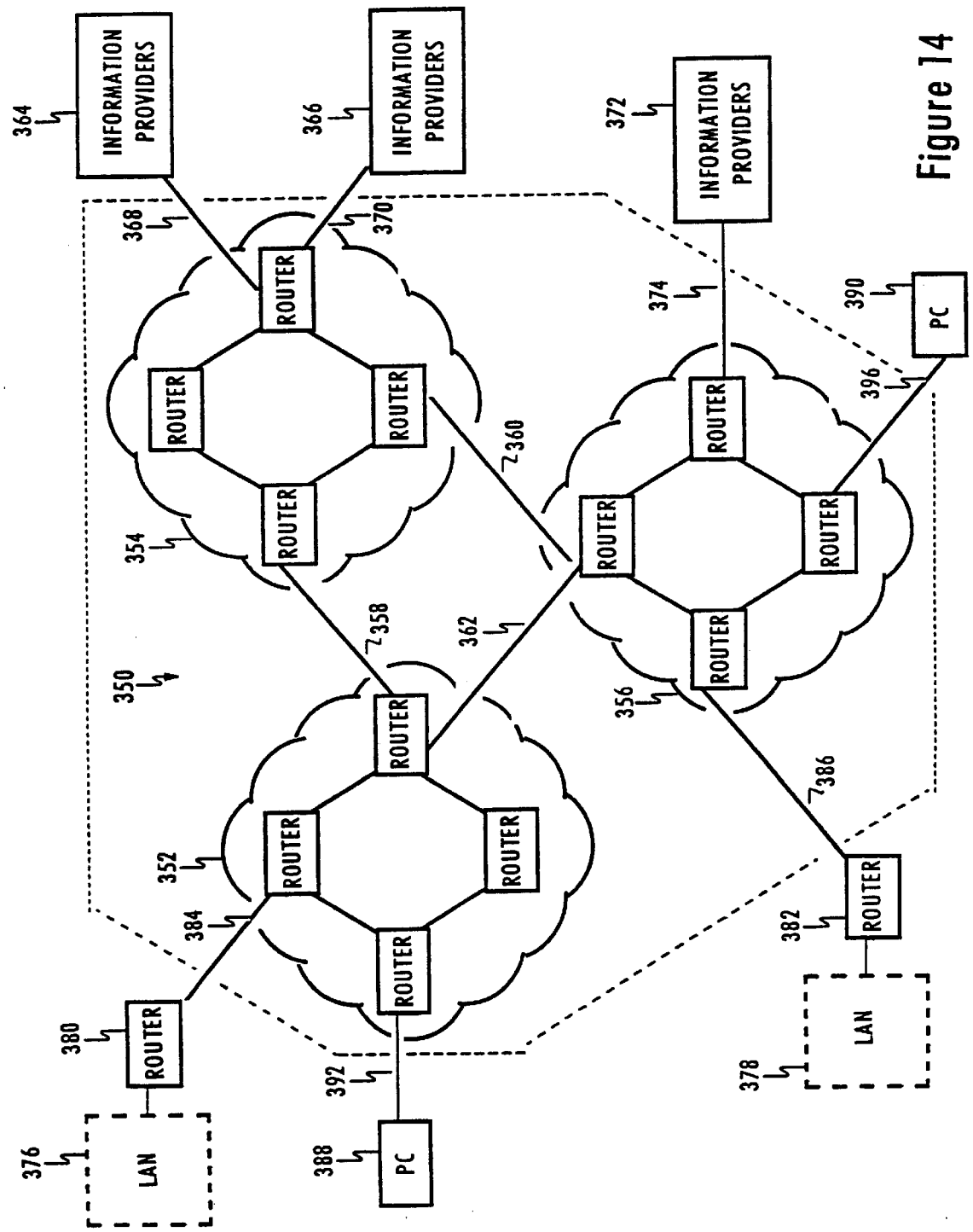
FIG. 14 is a simplified diagram of the Internet.

Referring to FIG. 14 there is shown a simplified diagram of the Internet. Generally speaking the Internet consists of Autonomous Systems (AS) which may be owned and operated by universities and research organizations and the like. Three such Autonomous Systems are shown in FIG. 14 at 352, 354 and 356. The Autonomous Systems (ASs) are linked by Inter-AS Connections 358, 362 and 360. Corporate Local Area Networks (LANs), such as those illustrated in 376 and 378, are connected through routers 380 and 382 and links shown as T1 lines 384 and 386. Laptop computers 388 and 390 are representative of computers connected to the Internet via the public switched telephone network (PSTN) are shown connected to the AS/ISPs via dial up links 392 and 396.

In simplified fashion the Internet. may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as SS7, frame relay and ATM or voice.

Referring to the embodiment of the invention illustrated in FIG. 12 an example of the operation of the system is now described. When the calling party at telephone station 100 dials the number of the desired foreign party, such as the telephone station 122 in Japan, the originating end office switch 102 and SSP 104 recognizes the call as directed to another switching office, suspends the call, formulates an SS7 packet message, and sends the message to the nearest STP 118. The STP analyzes the point code information in the packet and routes the packet according to the translation table stored within the STP. That translation table recognizes the foreign prefix as one requiring modified common channel signal handling and directs the packet to the Internet Module 130 for transmission over an Internet route. The Internet Module performs the necessary address determination from the information in the packet, adds the appropriate addressing and instructional overhead to encapsulate the packet in one or more TCP/IP packets, and transmits the packet or packets on to the Internet. The Internet uses a connectionless protocol and thus if multiple TCP/IP packets are transmitted they may or may not travel the same route and may or may not arrive in the same order at the destination server or Internet Module. However the destination Internet Module 140 will perform its TCP/IP function, strip the overhead, reform the original SS7 packet and deliver it to the SS7 capable control network of the destination telephone system. That network operates in its designed manner to send the message via the foreign SS7 network to the end switching office that serves the destination telephone line, i.e., to the terminating end office 128 in the illustrated example. The terminating end office determines whether or not the called station 122 is busy. If the called station is busy, the terminating end office so informs the originating end office via SS7 signaling in the foreign CCIS network, TCP/IP signaling in the Internet, and SS7 signaling in the originating switching system. The originating end office provides a busy signal to the calling station. If the called station 122 is not busy, the terminating end office 128 so informs the originating end office. A telephone connection is then constructed via the trunks, switching offices, and satellite link between the calling and called stations.

While the illustrative call did not require a higher level of control than that available from the STP, the system is capable of providing service features which require centralized program control from a higher level control point. Such control may be obtained according to the invention either from the ISCP which controls the CCIS network of the originating telephone network or, alternatively, from a central control such as the controller 140 connected to the Internet. Such a controller may emulate an ISCP and communicate with the Internet through a server or Internet Module similar to that shown and described in connection with FIG. 13.

Figure 15:
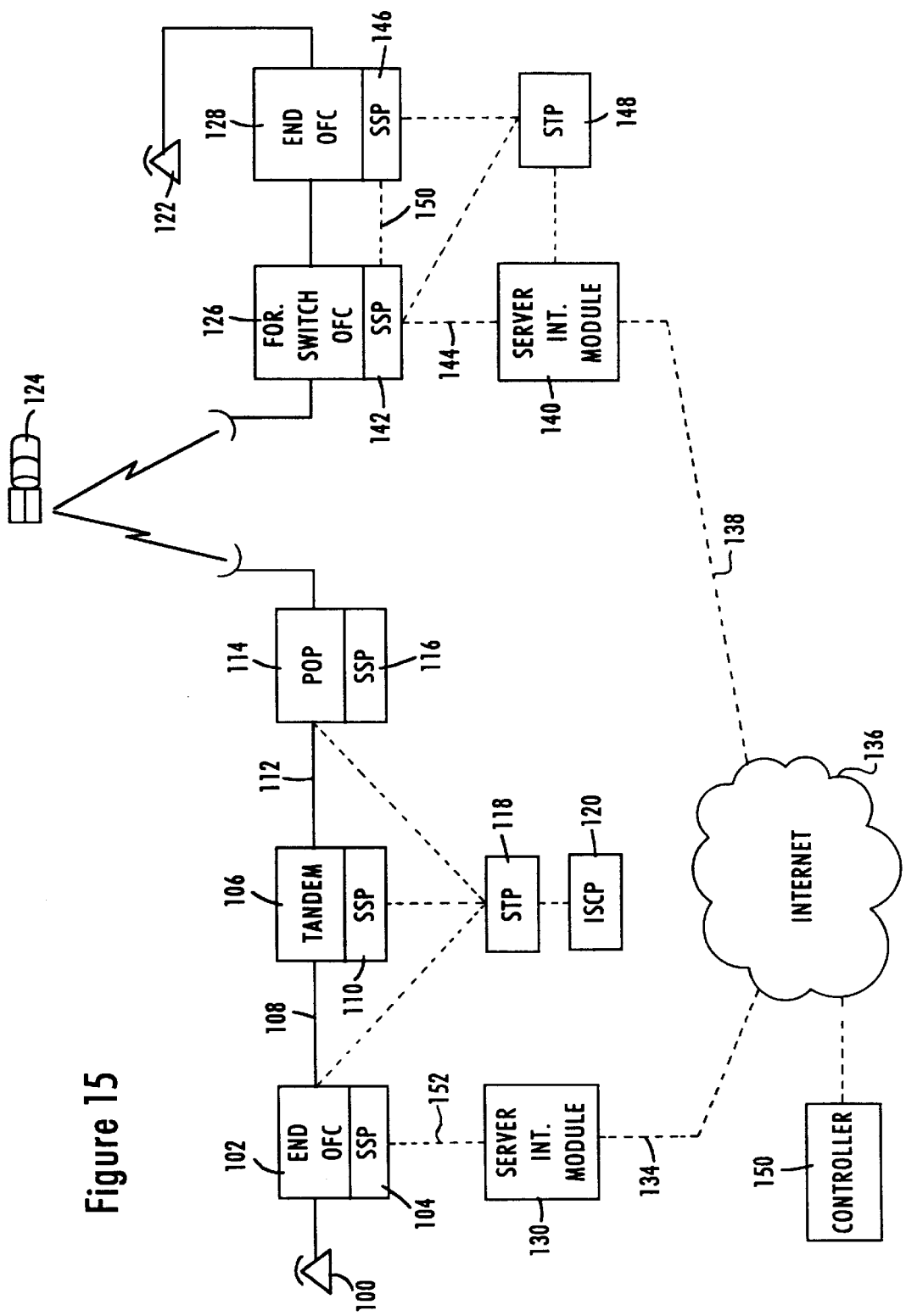
FIG. 15 is a simplified diagram illustrating another embodiment of the invention.

FIG. 15 illustrates a further embodiment of the invention which virtually eliminates the need for reliance on the CCIS network of the originating telephone network. The network shown in FIG. 15 is similar to that shown in FIG. 14 with the difference that the link 132 between server or Internet Module 130 and STP 118 in FIG. 14 has been eliminated and a data link has been established directly from the SSP 104 for end office 102.

In operation the caller dials the number of the called station complete with the foreign prefix. The SSP 104, programmed to recognize predetermined prefixes as an action trigger, momentarily suspends processing of the call and formulates a message to be sent to the Internet Module or server 130. The query message content and format is similar to that of the message sent from the STP 118 to the server 130 in the embodiment of the invention described in connection with FIG. 12. It will include the called party's number and an indication, such as the automatic number identification (ANI), of the calling station's number. It will also include an indication of call type (here, that the call is placed to a predesignated prefix and is to be handled via Internet signaling). This provides the Internet Module or server with an indication of the treatment the call is to receive. The Internet Module thereupon processes the message in the manner described in detail in connection with FIG. 12. If the called party is available a voice connection is set up. If the called line is busy a busy signal is provided to the calling party.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A telecommunications system, comprising:
   a first switched telecommunications network comprising: first program controlled switching systems serving first customer terminals connected by local links to the first program controlled switching systems, first trunks interconnecting the first program controlled switching systems for carrying interoffice communications to and from customer terminals, and a first common channel signaling system interconnecting the first program controlled switching systems for carrying call set-up signaling messages to and from the first program controlled switching systems for control of selective establishment of call connections to or from the first customer terminals via the first trunks in an interoffice signaling protocol;
   a second switched telecommunications network comprising: second program controlled switching systems serving second customer terminals connected by local links to the second program controlled switching systems, second trunks interconnecting the second program controlled switching systems for carrying interoffice communications to and from customer terminals, and a second common channel signaling system interconnecting the second program controlled switching systems for carrying call set-up signaling messages to and from the second program controlled switching systems for controlling selective establishment of call connections to or from the second customer terminals via the second trunks in the interoffice signaling protocol;

an open-access, non-proprietary internetwork connecting spaced dissimilar networks and using transmission control protocol/internet protocol (TCP/IP) to link the dissimilar networks;

a first interface, coupled to the first common channel signaling system and the internetwork, for communicating call set-up signaling messages in the interoffice signaling protocol to and from the first common channel signaling system over the internetwork in TCP/IP; and a second interface, coupled to the second common channel signaling system and the internetwork, for communicating call set-up signaling messages in the interoffice signaling protocol to and from the second common channel signaling system over the internetwork in TCP/IP, wherein the first and second interfaces enable exchange of call set-up signaling messages in the interoffice signaling protocol over the internetwork between the first and second common channel signaling systems, to enable selective establishment of a communication connection between a first customer terminal in one of the switched communications networks and a second customer terminal in the other of the switched telecommunications networks.

2. A system as in claim 1, wherein the established communication connection between the first and second customer terminals utilizes switched telecommunication circuits independent from the internetwork.

3. A system as in claim 1, wherein interoffice signaling protocol comprises signaling system 7, and each of the call set-up messages comprises a message of ISDN users part of the signaling system 7 protocol.

4. A system as in claim 1, wherein the internetwork comprises the INTERNET.

5. A system as in claim 1, wherein the established communication connection between the first and second customer terminals extends between the first and second switched telecommunications networks at least partially over a wireless link.

6. A system as in claim 1, wherein the first and second interfaces transmit and receive call set-up messages over the internetwork as TCP/IP packets encapsulating interoffice signaling messages created by the first and second switched telecommunications networks.

7. A system as in claim 1, wherein at least one of the call set-up signaling message exchanged via the first and second interfaces includes an identification number of a calling customer terminal in one of the first and second switched telecommunications networks and an identification number of a called customer terminal in the other of the first and second switched telecommunications networks.

8. A system as in claim 1, wherein the program controlled switching systems in the first switched telecommunications network include service switching points (SSPs), and the common channel signaling network in the first switched telecommunications network includes a signal transfer point (STP).

9. A system as in claim 8, wherein the first interface connects to the STP.

10. A system as in claim 8, wherein the first interface connects to one of the SSPs.

* * * * *